United States Patent Office 3,299,133
Patented Jan. 17, 1967

3,299,133
PROCESS FOR THE IMPROVEMENT OF THE STORAGE PROPERTIES OF UREA
Ernst Peterhans, Visp, and Friedrich Schiltknecht, Postfach, Basel, Switzerland, assignors to Lonza Ltd., Basel, Switzerland, a corporation of Switzerland
No Drawing. Filed Oct. 20, 1964, Ser. No. 405,243
Claims priority, application Switzerland, Oct. 24, 1963, 13,030/63
11 Claims. (Cl. 260—555)

It is known that urea is hygroscopic, even when in prilled form. As a result, the granules of urea tend to fuse together in storage causing the substance to lose its free-flowing characteristics.

The practice of improving the storability of urea through the addition of inorganic substances, such as e.g. double salts, for instance, aluminum ammonium sulfate or diatomaceous earth, is known from the literature. It is further known that it is possible to improve the storability through surface treatment with adduct-forming substances, e.g. the higher fatty acids, their derivatives or the higher hydrocarbons. All of these known methods are suitable if the urea is to be used as a fertilizer. If, however, the urea is to serve as the raw material for the production of plastics, such substances constitute a harmful interference.

Another group of known methods involves the use of additives which do not interfere with the utilization of urea as a raw material for the plastics industry. These additives consist mostly of water-soluble glyoxal-formaldehyde and urea-formaldehyde condensation products, which must be specially prepared accordingly to suitable methods.

It has now been discovered that it is possible to improve the storability of granular urea in a simple manner through the addition of amides of lower carboxylic acids.

An object of the invention is the improvement of the storage characteristics of urea through the addition of storability-improving additives, characterized by the fact that the said storability-improving additives consist of amides of the lower carboxylic acids having a carbon chain consisting of 1 to 4 carbons, said amides to be used in amounts of less than 1 percent by weight relative to the urea.

The amides of the lower carboxylic acids can be applied either in the pure form or as aqueous solutions. They can also be used in the form of mixtures. The use of acetamide is preferred.

The amides can be added to the urea in a great variety of ways. It is thus possible, for example, to apply an amide to the already prilled urea through a surface treatment. It may prove advisable, in this instance, to reheat the material following the application.

It is also possible to add the amide to an aqueous urea solution in the course of the synthesis of urea, or to a urea melt which had already been dehydrated and contains only a few percents of water, preceding or during the granulation process.

The result in any of these treatments will be a urea which is characterized by good storability and remains free-flowing.

The additives conforming to the invention are applied in quantities of less than 1 percent, preferably in amounts of 0.05–0.8 percent by weight relative to the urea.

EXAMPLES (1) 4 kgs. of urea granules are thoroughly mixed in a blender with formamide, acetamide, propionamide or a mixture of formamide and acetamide, in the amounts shown in Table 1. Some of the material was reheated after the blending. The urea specimens thus treated were then pressed for 4 days in 4 kg. bags under a pressure of 2 tons.

The results are presented in Table 1. The lumpiness, given in weight percents of urea, indicates the amount of urea remaining in the form of lumps after a single drop from a height of 15 cm.

Table 1

| Additive | Amount Weight percent | Water Addition, percent | Heating, °C. | Duration of Heating, hrs. | Lumps, percent |
|---|---|---|---|---|---|
| None | | | 95 | 72 | 40 |
| Do | | | 82 | 2 | 57 |
| Do | | 0.25 | | | 82 |
| Formamide | 0.05 | | 82 | 0.5 | 35 |
| Do | 0.1 | 0.1 | 82 | 2 | 30 |
| Do | 0.25 | | 82 | 0.5 | 35 |
| Do | 0.25 | 0.25 | 82 | 2 | 22 |
| Acetamide | 0.05 | | 82 | 2 | 4 |
| Do | 0.1 | | 82 | 2 | 2.5 |
| Do | 0.25 | | 82 | 2 | 0.6 |
| Do | 0.25 | 0.25 | 95 | 2 | 0 |
| Do | 0.25 | 0.25 | | | 0.6 |
| Propionamide | 0.05 | 0.05 | 95 | 2 | 12 |
| Do | 0.1 | 0.1 | 95 | 2 | 8 |
| Do | 0.25 | 0.25 | 95 | 2 | 9 |
| Formamide | 0.1 | | 82 | 0.5 | 13.4 |
| Acetamide 1:1 | 0.25 | | 82 | 0.5 | 0 |

(2) Mixtures of acetamide and water in a 1:1 proportion were added with the aid of a proportioning pump to a urea melt to be prilled and containing less than 1 percent of water; the mixture was then prilled. Table 2 presents the results obtained with varying amounts of the acetamide additive. The urea was then—as described in Example 1—pressed for 4 days under a pressure of 2 tons.

Table 2

| Acetamide weight, percent | Lumps, percent |
|---|---|
| 0 | 75 |
| 0.18 | 27 |
| 0.33 | 11 |
| 0.6 | 2.5 |
| 1.0 | 27 |

(3) To an aqueous solution of urea as obtained during the urea synthesis, an aqueous solution of acetamide was added prior to concentration of the urea solution by evaporation in a film evaporator. The amount of the acetamide relative to the urea was 0.25 percent by weight. In comparison with urea without acetamide, which exhibited a lump formation of 75 percent, the lumpiness of the material containing the additive was reduced to 16 percent.

When 0.5 percent by weight of acetamide was used, the lump formation amounted only to 3–4 percent.

We claim:
1. The process for improving the storage characteristics of urea which comprises incorporating therewith an effective amount up to less than about one percent by weight thereof, of an amide of a lower carboxylic acid containing from 1 to 4 carbon atoms per molecule.
2. The process defined by claim 1 wherein a mixture of said amides is so incorporated.
3. The process defined by claim 1 wherein the amide is acetamide.
4. The process defined by claim 1 wherein the amide is incorporated in an amount from about 0.05 to about 0.8 percent by weight of the urea.
5. The process defined by claim 1 wherein the amide is applied to the surface of urea.
6. The process defined by claim 1 wherein the amide is incorporated into an aqueous urea solution.
7. The process defined by claim 1 wherein the amide is incorporated with a urea melt of low water content as the urea is prilled.
8. A storage-stable urea containing a small and effective amount to improve the storage characteristics thereof up to less than one percent by weight thereof, of an amide of a lower carboxylic acid containing from 1 to 4 carbon atoms per molecule.
9. A storage-stable urea defined by claim 8 containing from about 0.05 to about 0.8 percent by weight of said amide.
10. A storage-stable urea defined by claim 8 containing a mixture of said amides.
11. A storage-stable urea defined by claim 8 wherein the amide is acetamide.

No references cited.

ALEX MAZEL, *Primary Examiner.*

HENRY R. JILES, *Examiner.*